United States Patent Office 3,161,649
Patented Dec. 15, 1964

3,161,649
SUBSTITUTED BENZOXAZOLES
Philip J. Breivogel, Glen Ridge, N.J., assignor to White Laboratories, Kenilworth, N.J., a corporation of New Jersey
No Drawing. Filed Mar. 5, 1962, Ser. No. 177,200
3 Claims. (Cl. 260—307)

This invention relates to compositions of matter classified in the art of chemistry as substituted benzoxazoles and to processes for making and using such compositions.

The invention sought to be patented, in its composition aspect, is described as residing in the concept of a chemical compound having a molecular structure in which there is attached to a benzoxazole nucleus a hydroxyl or an amino group in the 2-postion, a lower alkanoyl or lower carbalkoxy group in the 5-position, and in the benzenoid portion of the nucleus in other than the 5-position, hydrogen halogen or lower alkyl.

The invention sought to be patented, in one of its process aspects, is described as residing in the concept of using the tangible embodiment of a composition of matter having a molecular structure in which there is attached to a benzoxazole nucleus a hydroxyl or amino group in the 2-position, a lower alkanoyl or lower carbalkoxy group in the 5-position, and in the benzenoid portion of the nucleus in other than the 5-position hydrogen, halogen, or lower alkyl, by administering such composition as an essential active ingredient of a therapeutic formulation for the application of uricosuric therapy.

In another of its process aspects, the invention sought to be patented is described as residing in the concept of using the tangible embodiment of a composition of matter as described above by administering such composition as an essential active ingredient of a therapeutic formulation for the application of anti-inflammatory therapy.

The tangible embodiments of the invention possess the inherent applied use characteristics of exerting uricosuric and anti-inflammatory activity as evidenced by in vivo evaluation.

By the terms "uricosuric therapy" and "uricosuric activity" as used above, is meant therapy intended to lower the level of uric acid in the blood. Uricosuric agents inhibit renal tubular absorption of uric acid increasing, therefore, the renal clearance of ureates via the urine and accomplishing a marked drop in serum uric acid levels. Abnormal elevation of serum uric acid levels, usually through a metabolic fault, is often manifested as an arthritis-like condition characterized by the deposition in the joints, kidney, muscles and skin of metallic ureate salts. This deposition results in painful swelling, inflammation, tophi and restriction of movement.

The tangible embodiments of this invention are effective in the relief of such inflammatory condition.

As used herein the term "lower alkanoyl" means alkanoyl radicals, including the straight and branched chain radicals, among which are for purposes of illustration but without limiting the generality of the foregoing, formyl, acetyl, propionyl, n-butyryl, i-butytyl, n-valeryl, i-valeryl, n-caproyl and n-heptoyl. Particularly advantageous are those compounds wherein the lower alkanoyl moiety contains from two to six carbon atoms. The term "lower carbalkoxy" means carbalkoxy radicals, including straight and branched chain radicals, among which are, for example, carbomethoxy, carbethoxy, carbo-n-propoxy, carbo-i-propoxy, carbo-n-butoxy, carbo-i-butoxy, carbo-n-pentoxy, and carbo-3-pentoxy. Particularly advantageous are compounds wherein the carbalkoxy moiety contains from one to five carbon atoms. By the term "lower alkyl" is meant alkyl radicals, including straight and branched chain radicals, among which are, for example, methyl, n-propyl, i-propyl, n-butyl, and i-butyl. Advantageously, the lower alkyl moiety contains from 1–3 carbon atoms. Where the benzenoid portion of the nucleus contains halogen, the preferred halogen is chlorine.

The manner and process of making and using the invention will now be generally described so as to enable a person skilled in the art of chemistry to make and use the same, as follows:

The 2-hydroxybenzoxazole embodiments of my concept are readily prepared from unsubstituted and ring substituted 3-amino-4-hydroxy-benzoic acid esters (where a 5-lower carbalkoxy substituent is desired) and from unsubstituted and ring substituted 3-amino-4-hydroxyacyl-benzenes (where a 5-lower alkanoyl substituent is desired) by reacting said 3-amino-4-hydroxy compound in a suitable organic solvent medium with an approximately equimolar quantity of phosgene. The 3-amino-4-hydroxy starting material may be used either as the free base or as the corresponding acid addition salt (i.e. the hydrochloride). When the free base is employed, the reaction is carried out in the presence of calcium carbonate in an approximately 3 to 2 molar ratio (calcium carbonate to free base). Where the starting material is in the form of the hydrochloride, the calcium carbonate to hydrochloride ratio is adjusted to at least 2 to 1. In place of calcium carbonate in whole or in part, there may be used pyridine, triethylamine or other tertiary amine. Suitable organic solvents for the reaction include acetone, benzene toluene, carbon tetrachloride, dioxane or other organic solvents which will not react with phosgene.

The reaction may be carried out, for example, by adding a measured quantity of the 3-amino-4-hydroxy compound to a sufficient quantity of the organic solvent medum to effect solution and stirring at room temperature until solution is complete (where an acid addition salt of the 3-amino-4-hydroxy compound is employed stirring is continued until a uniform dispersion is obtained). Calcium carbonate, or its equivalent as disclosed above, is then added and the reaction mixture is cooled to 10–20° C. While maintaining this temperature, a solution of phosgene in an additional quantity of the organic solvent medium is added dropwise over a period of 0.5–1.0 hour. Stirring at 15–25° C. is continued for 1.0–3.0 hours and the temperature is then raised to 50–55° C. and held there for approximately 1–3 hours while stirring is continued. The solvent is then removed by distillation and water is added to the cooled residue in the reaction flask. The pH is adjusted to approximately 1.2 with hydrochloric acid and the crude benzoxazole is separated by filtration. Recrystallization from methanol, isopropanol, dioxane, or other suitable organic solvent yields the pure benzoxazole.

In the preparation of the 2-aminobenzoxazole embodiments of my concept, cyclization of the 3-amino-4-hydroxy starting materials, as disclosed above, is effected in the presence of an approximately equi-molar quantity of cyanogen bromide in place of phosgene. Thus the 3-amino-4-hydroxy compound (either the free base or acid addition salt) is dissolved in a water miscible solvent which will not react with cyanogen bromide (i.e. methanol, ethanol, etc.) and the resulting solution is cooled to approximately 5° C. by the addition of ice. To the cooled reaction mixture is then rapidly added an aqueous suspension of cyanogen bromide. After all of the cyanogen bromide has been added (about 5 minutes), stirring at 20–25° C. continued for approximately 0.5–1.0 hour whereupon an approximately equi-molar quantity of solid sodium bicarbonate in small portions is added over a period of approximately 1.0–2.0 hours to neutralize the hydrobromic acid formed in the reaction and to adjust the pH to approximately 6.5–7.0. After stirring for about an hour longer, the crude 2-aminobenzoxazole is separated by filtration, washed with water and purified by recrystallization from ethanol, isopropanol, dioxane, or other suitable organic solvent. Where the 3-amino-4-hydroxy starting material is in the form of the acid addition salt, water may be used as the sole reaction solvent.

The reactions described above may be illustrated as follows:

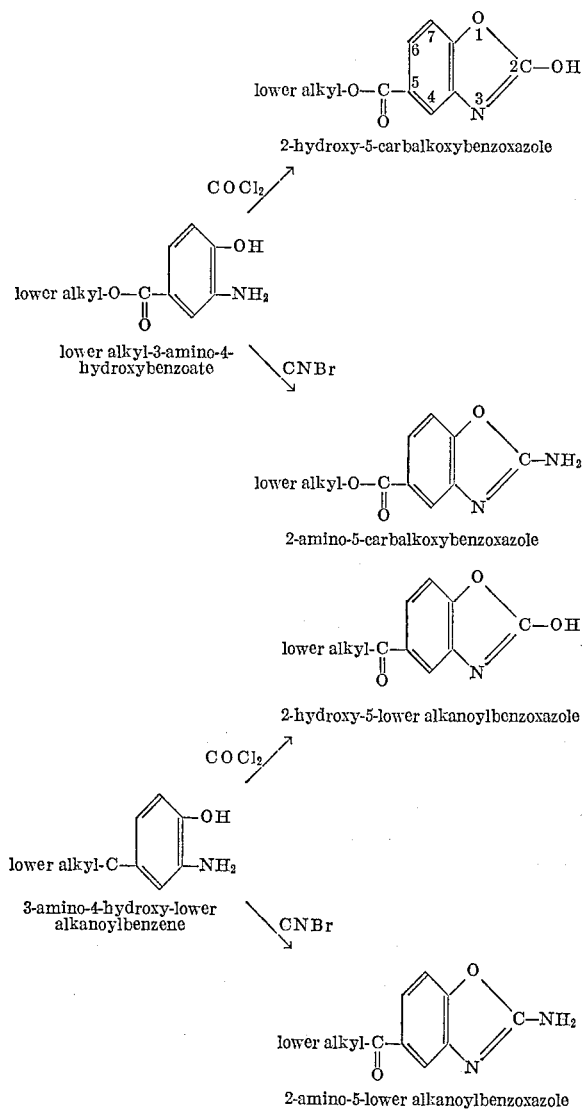

The unsubstituted and ring substituted 3-amino-4-hydroxybenzoic acid esters and 3-amino-4-hydroxyacyl-benzenes which are used as starting materials in the process described above are either known compounds or can be prepared in a manner now to be described.

Conveniently, the 3-amino-4-hydroxy compounds are prepared by catalytic reduction (i.e. hydrogenation over a palladium on carbon catalyst) of the corresponding 3-nitro-4-hydroxy compounds. These latter compounds, in turn, may be prepared by conventional nitrogen techniques from the corresponding 4-hydroxy compounds.

In this manner, for example, n-propyl-4-hydroxybenzoate (I) may be treated with concentrated nitric acid in an acetic acid medium to yield n-propyl-3-nitro-4-hydroxybenzoate (II). This compound may then be subjected to hydrogenation over a palladium on carbon catalyst to give n-propyl-3-amino-4-hydroxybenzoate (III). Similarly, a 4-hydroxyacylbenzene such as 4-hydroxypropiophenone (IV), for example, may be converted by nitration to 3-nitro-4-hydroxypropiophenone (V) and the nitro group subsequently reduced to yield 3-amino-4-hydroxypropiophenone (VI).

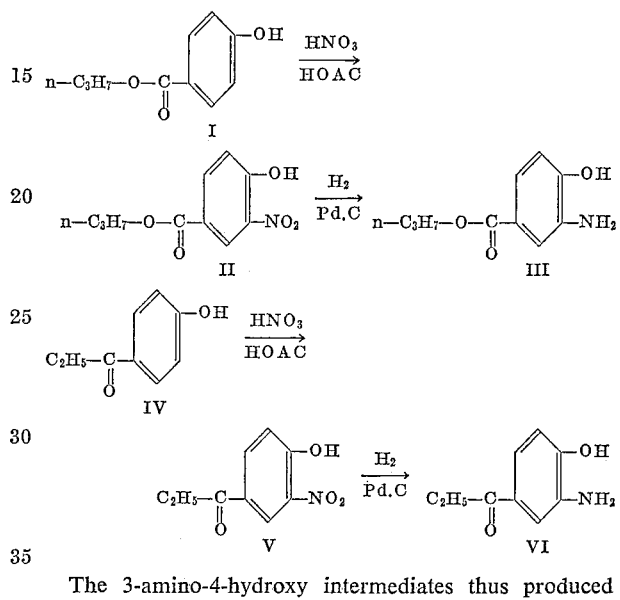

The 3-amino-4-hydroxy intermediates thus produced may be converted into the corresponding 2-hydroxy-5-carbalkoxy- and 2-amino-5-carbalkoxy or 2-hydroxy-5-alkanoyl- and 2-amino-5-alkanoylbenzoxazoles by the methods described above. Thus compound (III) may be converted into 2-hydroxy-5-carbo-n-propoxybenzoxazole (VII) and 2-amino-5-carbo-n-propoxybenzoxazole (VIII) while compound (VI) may be converted into 2-hydroxy-5-propionylbenzoxazole (IX) and 2-amino-5-propionylbenzoxazole (X). It is of course obvious that where 5-carbalkoxy or 5-alkanoyl substituents other than the 5-carbo-n-propoxy- and 5-propionyl substituents of the above illustrations are desired, it is merely necessary to select the appropriate 3-amino-4-hydroxy-, 3-nitro-4-hydroxy-1, or 4-hydroxy benzoic acid ester or acylbenzene as the starting material.

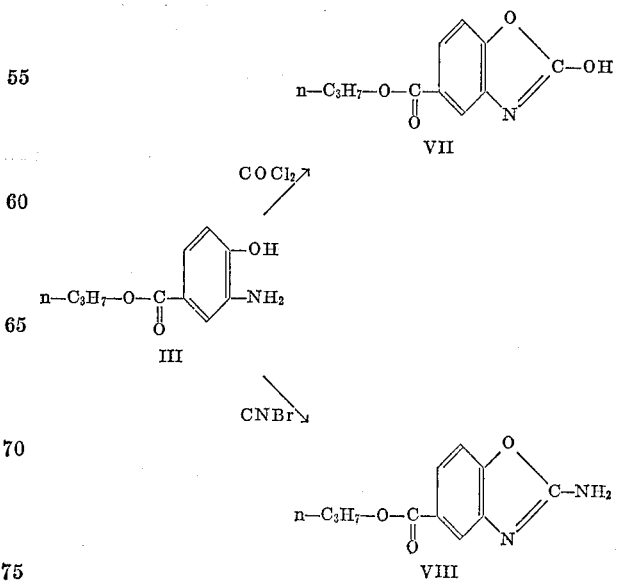

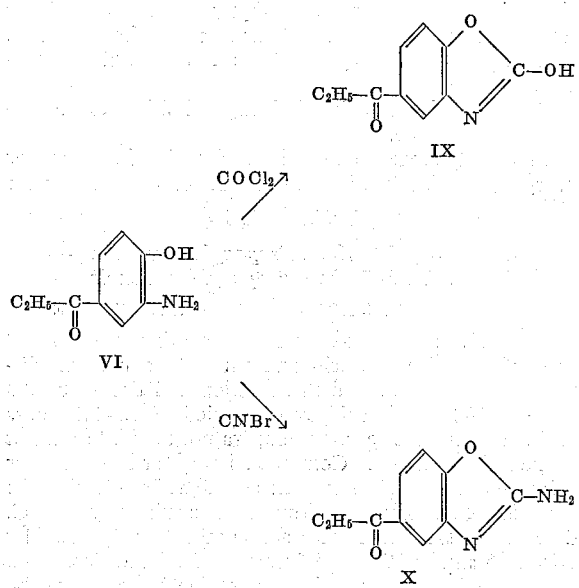

In this manner, for example, 6-methyl-3-nitro-4-hydroxyacetophenone (XI) may be treated with sodium hypobromite whereby the alkanoyl function is oxidized to yield 6-methyl-3-nitro-4-hydroxybenzoic acid (XII) which is subjected to catalytic hydrogenation to give 6-methyl-3-amino-4-hydroxybenzoic acid (XIII). The free acid then may be esterified by reaction with anhydrous ethanol to give ethyl-6-methyl-3-amino-4-hydroxybenzoate (XIV) which may be converted as described above into 2-hydroxy-5-carbo-6-methylethoxybenzoxazole (XV) or 2-amino-5-carbo-6-methylethoxybenzoxazole (XVI). It is of course obvious that the 3-nitro-4-hydroxyacylbenzene employed as the starting material is not limited to an acetylbenzene and that any desired anhydrous alcohol may be used in the esterification step.

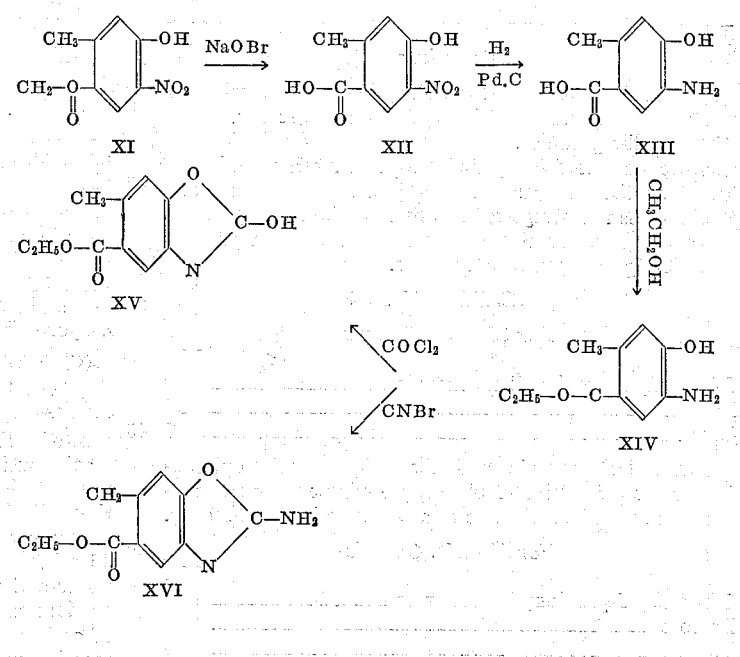

Alternatively, the 5-carbalkoxybenzoxazoles, as well as the 5-alkanoylbenzoxazoles, of my concept may be prepared from unsubstituted and ring substituted 3-nitro-4-hydroxyacylbenzenes. Since ring substituted 3-nitro-4-hydroxyacylbenzenes are readily available starting materials, or can be easily prepared, this method is particularly desirable where 5-carbalkoxy and 5-alkanoylbenzoxazoles are desired which carry substituents other than hydrogen in the benzenoid portion of the molecule.

According to this process, the 3-nitro-4-hydroxyacylbenzene starting material is subjected to the oxidative action of an alkali metal hypohalite to yield the corresponding 3-nitro-4-hydroxybenzoic acid. This compound is then catalytically reduced, by methods previously described, to the corresponding 3-amino-4-hydroxybenzoic acid. Treatment of the 3-amino-4-hydroxybenzoic acid with anhydrous alcohol gives the corresponding 3-amino-4-hydroxybenzoic acid ester which may then be converted into the 5-carbalkoxybenzoxazole by the methods described above.

Where 5-alkanoylbenzoxazoles are desired, the 3-nitro-4-hydroxyacylbenzene starting materials may be reduced to the corresponding amine and the latter compounds cyclized by the procedures already described.

In those cases where the alkanoyl group of the 3-nitro-4-hydroxyacylbenzene starting material is flanked on both sides by alkyl substituents, the starting material cannot be satisfactorily cleaved by the haloform reaction described above due to steric hindrances. The desired 3-nitro-4-hydroxybenzoic acid intermediate in such cases may be conveniently prepared by demethylation of the corresponding methoxy compound. Thus 2,6-dimethyl-3-nitro-4-methoxybenzoic acid may be converted into 2,6-dimethyl-3-nitro-4-hydroxybenzoic acid by treatment at reflux with 48% hydrobromic acid in an acetic acid medium. The latter compound then may be converted into the desired 4,6-dimethylbenzoxazole end product by the methods described above.

The therapeutically active benzoxazoles of this invention can be administered orally in the form of tablets, elixirs, capsules and the like. In tablet form, they are compounded with an inert pharmaceutical carrier which may contain a suitable binder such as, for example, gums, starches and sugars. They may also be incorporated into a gelatin capsule and also formulated into elixirs which have the advantage of being susceptible to manipulations in flavor by the addition of standard natural or synthetic flavoring materials. Preferably, these compositions are so proportioned as to afford a unit dosage of from 250–500 mg.

The following examples show typical tablet, capsule and elixir formulations incorporating the therapeutically active benzoxazoles of this invention. These formulations are illustrative merely and no limitation is intended except as set forth in the appended claims.

TABLET FORMULATION

Formula

|  | Per 500 mg. Tablet | Per 250 mg. Tablet |
| --- | --- | --- |
|  | Mg. | Mg. |
| 2-Hydroxy-5-propionylbenzoxazole | 500 | 250 |
| Starch (as 10% w./w. paste) | 20 | 10 |
| Starch | 50 | 25.5 |
| Magnesium Stearate | 3 | 1.5 |
|  | 573 | 287.0 |

Procedure (1) Wet the 2-hydroxy-5-propionylbenzoxazole with the starch paste and force through an 8 mesh screen.
(2) Dry the granules.
(3) Reduce the dried granules to a 14-mesh granulation.
(4) Add the starch and magnesium stearate, blend and compress at a weight of 573 mg. for the 500 mg. tablet or 287 mg. for the 250 mg. tablet using a suitable tableting pan, punches and dies.

ENCAPSULATION

For 250 Mg. Capsule

| | Mg. |
| --- | --- |
| 2-hydroxy-5-propionylbenzoxazole | 250 |
| Lactose | 93 |
| Talc | 7 |

Blend lactose, talc and the 2-hydroxy-5-propionylbenzoxazole in suitable blending equipment and encapsulate into a No. 2 capsule at a target weight of 350 mg.

For 500 Mg. Capsule

| | Mg. |
| --- | --- |
| 2-hydroxy-5-propionylbenzoxazole | 500 |
| Lactose | 176 |
| Talc | 14 |

Blend as for 250 mg. capsule and encapsulate at a target weight of 690 mg. in a No. 0 capsule.

LIQUID SUSPENSION

Formula

| | Gm. per liter |
| --- | --- |
| Veegum HV | 3.0 |
| Water | 150.0 |
| Methyl paraben | 1.0 |
| 2-hydroxy-5-propionylbenzoxazole ground to pass 325 mesh sieve | 50.0 |
| Kaolin | 10.0 |
| Flavor | 1.0 |
| Glycerin, q.s. to 1 liter. | |

Suspend Veegum in water with vigorous agitation, add methyl paraben and allow to stand overnight to ensure complete hydration of the Veegum.

In another vessel suspend 2-hydroxy-5-propionylbenzoxazole in approximately 750 cc. of glycerol. Add kaolin and stir until homogeneous. Then slowly add aqueous dispersion of Veegum and methyl paraben. Add flavor and continue agitation for 1 hour to ensure homogeneity. Q.s. with remaining glycerin to 1:1. Stir until homogeneous.

1 teaspoonful contains 250 mg. of 2-hydroxy-5-propionylbenzoxazole.

The best mode contemplated by the inventor for carrying out his invention will now be set forth as follows:

EXAMPLE 1

*2-Hydroxy-5-Carbo-n-Propoxybenzoxazole—*
*2-Amino-5-Carbo-n-Propoxybenzoxazole*

(A) n-PROPYL 3-NITRO-4-HYDROXYBENZOATE

Add 1.77 mole of n-propyl 4-hydroxybenzoate to 900 mls. of glacial acetic acid and stir until a uniform dispersion is obtained. To this solution add dropwise 1.98 mole of 93% nitric acid over a period of 1.5–2.0 hours while allowing the reaction temperature to rise to but not to exceed, 41–43° C. Continue stirring for 3 hours after all of the nitric acid has been added while allowing the reaction temperature to drop to approximately 27° C. In a thin stream, pour the reaction mixture into a rapidly stirred mixture of 7 liters of water and 1 kg. of ice. Add 100 mls. of 10 molar sodium hydroxide to neutralize the excess nitric acid. Stir for one hour. Filter the mixture and wash the filter cake with about 6 liters of cold water. Dry the crude n-propyl 3-nitro-4-hydroxybenzoate in air at room temperature and recrystallize from cyclohexane.

(B) n-PROPYL 3-AMINO-4-HYDROXYBENZOATE

Dissolve 1.5 mole of n-propyl 3-nitro-4-hydroxybenzoate in 2 liters of methanol and add 8.0 gms. of 5% palladium on carbon catalyst. Stir the mixture rapidly and hydrogenate at 50–55° C. at a pressure slightly above atmospheric. When the theoretical amount of nitrogen has been taken up (approximately 6 hours), remove the catalyst by filtration. Remove the solvent from the reaction mixture by distillation from a steam bath, finally applying vacuum to insure complete removal of solvent and moisture. Recrystallize the crude n-propyl 3-amino-4-hydroxybenzoate from water.

(C) 2-HYDROXY-5-CARBO-n-PROPOXYBENZOXAZOLE

Stir rapidly a mixture of 0.2 mole of n-propyl 3-amino-4-hydroxybenzoate, 30 gms. of calcium carbonate and 350 mls. of carbon tetrachloride and cool to 10–15° C. Add a solution of 0.215 mole of phosgene in 75 mls. of carbon tetrachloride dropwise over a period of 1 hour. Continue stirring at 20–25° C. for 3 hours and then raise the temperature to 50–55° C. and stir for 2.5 hours. Add 15 mls. of concentrated hydrochloric acid in 200 mls. of water and continue stirring at 50–55° C. until all excess calcium carbonate is dissolved. Add a sufficient quantity of carbon tetrachloride 55° C. to completely dissolve the reaction product. Remove the aqueous layer and wash the carbon tetrachloride solution with water at 50° C. Dry the reaction mixture over sodium sulfate, filter through decolorizing carbon and adjust the filtrate volume to 800 mls. with additional carbon tetrachloride. Allow the filtrate to stand at 5° C. for several hours to crystallize. Separate the crystals by filtration, wash with cold carbon tetrachloride and dry. Recrystallize the crude 2-hydroxy-5-carbo-n-propoxybenzoxazole from 45% aqueous methanol.

(D) 2-AMINO-5-CARBO-n-PROPOXYBENZOXAZOLE

To prepare the cyanogen bromide reagent, cool a mixture of 1.62 mole of bromine and 0.5 ml. of acetic acid by the addition of 600 gms. of chopped ice. Stir the mixture while adding a solution 1.7 mole of potassium cyanide in 175 mls. of water in a thin stream over a period of about 5 minutes. Add sufficient ice during this period to prevent the temperature from rising above 10° C. Add just sufficient potassium cyanide solution to decolorize the bromine, carefully avoiding an excess. Keep the resulting solution containing suspended cyanogen bromide crystals at 10° C. and use as soon as possible.

Cool a solution of 1.3 mole of n-propyl 3-amino-4-hydroxybenzoate in 800 mls. of methanol to 5° C. by the addition of chopped ice. Add the cyanogen bromide suspension prepared above over a period of about 5 minutes with efficient stirring. Continue stirring for 0.75 hour while keeping the reaction temperature at 20–25° C. Add 1.3 mole of solid sodium bicarbonate in small portions over a period of about 1.5 hours to neutralize the acid formed in the reaction and eventually bring the pH to 6.5–7.0. Continue stirring at 25° C. for 1 hour. Filter the suspended crystals of crude 2-amino-5-carbo-n-propoxybenzoxazole, wash with about 4 liters of water, and dry at 50° C. Purify the crude material by dissolving in about 8 times its weight of boiling dioxane, treating the resulting solution with decolorizing carbon and allowing the filtrate to crystallize at about 20° C. Separate the crystals by filtration and wash with cold dioxane.

EXAMPLE 2

*2-Hydroxy-5-Carbo-n-Butoxybenzoxazole—2-Amino-5-Carbo-n-Butoxybenzoxazole*

(A) n-BUTYL 3-NITRO-4-HYDROXYBENZOATE

Dissolve 0.75 mole of n-butyl 4-hydroxybenzoate in 475 mls. of glacial acetic acid. With stirring add 0.8 mole of 95.2% nitric acid dropwise over a period of about 1.5 hours while keeping the reaction temperature at 28–32° C. Continue stirring at 28–30° C. for 1 hour. Pour the reaction mixture in a thin stream and with rapid stirring into a mixture of 500 gms. of ice and 2.5 liters of water. Extract the oily nitro compound with ethyl acetate and wash the extract with sodium bicarbonate solution. Wash the extract with water, dry over anhydrous sodium sulfate and remove the solvent by distillation.

(B) n-BUTYL 3-AMINO-4-HYDROXYBENZOATE

Dissolve 0.2 mole of n-butyl 3-nitro-4-hydroxybenzoate in 160 mls. of methanol and add 0.3 gm. of 5% palladium on carbon catalyst. Hydrogenate by shaking with hydrogen at 40–50 lbs. pressure and at 65° C. until the theoretical amount of hydrogen is taken up (about 2.5 hours). Cool to 25° C. and add 20 mls. of 10 molar aqueous hydrochloric acid. Remove the catalyst by filtration. Remove the solvent by distillation from a steam bath finally applying vacuum to ensure complete removal of solvent and moisture. Recrystallize the crude crystalline n-butyl 3-amino-4-hydroxybenzoate hydrochloride from a mixture of equal parts of ethyl acetate and isopropanol.

To prepare the free base, dissolve 37.5 gms. of the hydrochloride in 500 mls. of water and about 5 mls. of saturated sulfurous acid solution at about 30° C. Add 10% sodium carbonate solution until the pH is adjusted to about 6.5. Filter the precipitated base, wash with water containing a trace of sodium hydrosulfite and dry in air at room temperature.

(C) 2-HYDROXY-5-CARBO-n-BUTOXYBENZOXAZOLE

Mix 0.2 mole of n-butyl 3-amino-4-hydroxybenzoate and 400 mls. of acetone. Stir at room temperature until solution is complete, then add 0.3 mole of calcium carbonate while continuing stirring. Cool the solution to 15–20° C. and add dropwise a solution of 0.24 mole of phosgene in 75 mls. of acetone over a period of 0.5 hour. Continue stirring at 15–20° C. for 1.5 hours then raise the temperature to 50–55° C. and stir for 1 hour longer. Cool the reaction mixture to 25° C. and add gradually a solution of 20 mls. of concentrated hydrochloric acid in 25 mls. of water. Continue to stir for 5 minutes. Separate the acetone layer and separate the solvent by distillation from a steam bath finally applying vacuum to insure complete removal of the solvent and moisture. Dissolve the residue in 300 ml. of ethyl acetate at room temperature and decolorize by stirring with 5.0 gms. of decolorizing carbon. Heat the mixture to 50° C. filter, and concentrate the filtrate to about 100 mls. Cool to 40° C. and gradually add 275 mls. of petroleum ether. Allow the resulting crystalline suspension to stand at 15° C. for several hours. Separate the crystals by filtration, wash with petroleum ether and dry.

(D) 2-AMINO-5-CARBO-n-BUTOXYBENZOXAZOLE

Dissolve 1.3 mole of n-butyl 3-amino-4-hydroxybenzoate in 1,000 mls. of methanol and cool the solution to 5° C. by the addition of chopped ice. Add a cold suspension of 1.5 moles of cyanogen bromide in 1,000 mls. of water (see Example 1(D) for preparation) over a period of 5 minutes with rapid stirring. Continue stirring at 20–25° C. for 0.75 hour. Add with continued stirring 1.3 moles of solid sodium bicarbonate in small portions over a period of 1.5 hours eventually bringing the pH to 6.5–7.0. Stir for 1 hour longer. Separate the 2-amino-5-carbo-n-butoxybenzoxazole by filtration, wash with water and recrystallize from ethanol.

EXAMPLE 3

*2-Hydroxy-5-Propionylbenzoxazole—2-Amino-5-Propionylbenzoxazole*

(A) 3-NITRO-4-HYDROXYPROPIOPHENONE

Suspend 0.6 mole of 4-hydroxypropiophenone in 160 mls. of glacial acetic acid at room temperature and stir rapidly. Add 0.61 mole of 94% nitric acid dropwise over a period of 1 hour, allowing the reaction temperature to rise to 38–40° C. Continue to stir for 1 hour, allowing the reaction temperature to fall naturally. Pour the reaction mixture in a thin stream into a rapidly stirred mixture of 500 gms. of ice and 1 liter of water. Stir until all of the ice melts and separate the suspended crystals by filtration. Wash the filter cake with 1 liter of water and dry in air at room temperature. Recrystallize the crude 3-nitro-4-hydroxypropiophenone from methanol.

(B) 3-AMINO-4-HYDROXYPROPIOPHENONE HYDROCHLORIDE

Dissolve 0.2 mole of 3-nitro-4-hydroxypropiophenone in 150 mls. of methanol and add 0.3 gm. of 5% palladium on carbon catalyst. Hydrogenate by shaking with hydrogen at 30–50 lbs. pressure at 60° C. until the theoretical amount of hydrogen is taken up (about 1.25 hours). Cool the reaction mixture to 25° C. and add 20 ml. of 10 molar hydrochloric acid. Remove the catalyst by filtration. Remove the solvent by distillation from a steam bath, first at atmospheric pressure then under vacuum to insure complete removal of the methanol and water. Wash the crystalline residue with about 75 mls. of ethyl acetate and then recrystallize from isopropanol.

(C) 2-HYDROXY-5-PROPIONYLBENZOXAZOLE

Mix 0.15 mole of 3-amino-4-hydroxypropiophenone hydrochloride, 200 mls. of acetone and 0.15 mole of anhydrous triethylamine and stir rapidly. Add 0.25 mole of calcium carbonate over a period of about 5 minutes. Cool the reaction mixture to 15–20° C. while adding dropwise a solution of 0.2 mole of phosgene in 50 mls. of acetone over a period of about 0.5 hour. Continue to stir at 15–20° C. for 1 hour and then raise the temperature to 50–55° C. and stir for 0.75 hour. Cool the reaction mixture to 10° C. and separate the suspended crystals by filtration. Wash the filter cake with sufficient 5% hydrochloric acid solution at 25° C. to dissolve all excess calcium carbonate and then wash the filter cake with water and dry at 50° C. Recrystallize from anhydrous ethyl alcohol.

(D) 2-AMINO-5-PROPIONYLBENZOXAZOLE

Dissolve 0.08 mole of 3-amino-4-hydroxypropiophenone hydrochloride in 100 ml. of water at room temperature and add 0.08 mole of sodium acetate trihydrate.

Cool the reaction mixture to 10° C. and stir while adding a solution of cyanogen bromide (prepared by slowly adding a solution of 0.092 mole of potassium cyanide in 20 mls. of water to a mixture of 0.087 mole of bromine, 20 mls. of water and 60 gms. of ice with rapid stirring until the bromine is just decolorized) over a period of about 5 minutes. Continue stirring at 10–15° C. for about 10 minutes and then add an additional 0.08 mole of sodium acetate trihydrate. Continue to stir at about 25° C. for 2 hours longer. Filter the crystalline suspension, wash the filter cake with water and dry at 60° C. Recrystallize the crude 2-amino-5-propionylbenzoxazole from 200 mls. of anhydrous ethyl alcohol.

EXAMPLE 4

*2-Hydroxy-6-Methyl-5-Acetylbenzoxazole*

Mix 0.15 mole of 6-methyl-3-amino-4-hydroxyacetophenone hydrochloride and 200 mls. of acetone. Cool the mixture to 15–20° C. and stir while adding 0.15 mole of anhydrous triethylamine. Add 0.25 mole of calcium carbonate in small portions over a period of about 5 minutes. Continue stirring until a uniform dispersion is obtained. While maintaining a reaction temperature of 15–20° C., add a solution of 0.2 mole of phosgene in 50 mls. of acetone dropwise over a period of about 0.5 hour. Continue stirring at 15–20° C. for 1 hour and then raise the temperature to 50–55° C. and stir for about 0.75 hour until evolution of carbon dioxide ceases. Cool the reaction mixture to 10° C., filter and wash the filter cake with sufficient 5% hydrochloric acid solution to remove any excess calcium carbonate. Wash with water, dry and recrystallize from anhydrous ethyl alcohol.

EXAMPLE 5

*2-Amino-6-Methyl-5-Acetylbenzoxazole*

Dissolve 1.3 moles of 6-methyl-3-amino-4-hydroxyacetophenone in 1,000 mls. of methanol and cool the solution to 5° C. by the addition of chopped ice. Add a cold suspension of 1.5 mole of cyanogen bromide in 1,000 mls. of water (see Example 1(D) for preparation) over a period of about 5 minutes with rapid stirring. Continue stirring at 20–25° C. for 0.75 hour. Add 1.3 moles of solid sodium bicarbonate in small portions over a period of 1.5 hours, eventually adjusting the pH to 6.5–7.0. Stir for 1 hour longer. Filter the crude 2-amino-6-methyl-5-acetylbenzoxazole, wash with water, and purify by recrystallization from dioxane.

EXAMPLE 6

*2-Hydroxy-6-Methyl-5-Propionylbenzoxazole*

Employ the process of Example 4, to convert 6-methyl-3-amino-4-hydroxypropiophenone into 2-hydroxy-6-methyl-5-propionylbenzoxazole.

EXAMPLE 7

*2-Amino-6-Methyl-5-Propionylbenzoxazole*

Employ the process of Example 5, to convert 6-methyl-3-amino-4-hydroxypropiophenone into 2-hydroxy-6-methyl-5-propionylbenzoxazole.

EXAMPLE 8

*2-Hydroxy-4-i-Propyl-7-Methyl-5-Acetylbenzoxazole*

Employ the process of Example 4, to convert 2-i-propyl-5-methyl-3-amino-4-hydroxyacetophenone into 2-hydroxy-4-i-propyl-7-methyl-5-acetylbenzoxazole.

EXAMPLE 9

*2-Amino-4-i-Propyl-7-Methyl-5-Acetylbenzoxazole*

Employ the process of Example 5, to convert 2-i-propyl-5-methyl-3-amino-4-hydroxyacetophenone into 2-hydroxy-4-i-propyl-7-methyl-5-acetylbenzoxazole.

EXAMPLE 10

*2-Hydroxy-7-Methyl-5-Propionylbenzoxazole—*
*2-Amino-7-Methyl-5-Propionylbenzoxazole*

(A) 5-METHYL-3-NITRO-4-HYDROXYPROPIOPHENONE

Dissolve 0.5 mole of 5-methyl-4-hydroxypropiophenone in 250 ml. of acetic acid and stir at 35–40° C. while adding 0.55 mole of 70% nitric acid dropwise over a period of about 1 hour. Continue stirring at 30° C. for 1 hour. Pour the reaction mixture into a rapidly stirred mixture of 200 gms. of ice and 1,200 ml. of water. Filter the crystalline product, wash with water and recrystallize from 300 ml. of methanol.

Where desired, the 5-methyl-4-hydroxypropiophenone employed above may be prepared from o-cresyl propionate as follows:

Saturate 1.5 mole of o-cresyl propionate with 1.25 mole of boron trifluoride over a period of 3 hours at 15–20° C. Heat the mixture on a steam bath for 2 hours and allow to stand at room temperature over night. Stir the reaction mixture with a solution of 300 gms. of sodium acetate trihydrate in 2,000 mls. of water and make strongly alkaline by the addition of about 500 mls. of 10 molar sodium hydroxide solution. When solution is complete, adjust the pH to 5.0 with concentrated hydrochloric acid and distill with steam to remove the ortho isomer and a small amount of cresol. Cool the residual mixture to room temperature and filter the crystalline product. Dry the filter cake and recrystallize from benzene.

(B) 5-METHYL-3-AMINO-4-HYDROXYPROPIOPHENONE HYDROCHLORIDE

Dissolve 0.2 mole of 5-methyl-3-nitro-4-hydroxypropiophenone in 150 mls. of methanol and hydrogenate at 30–50 lbs. pressure and 60° C. in the presence of 0.3 gm. of 5% palladium on carbon catalyst until the theoretical amount of hydrogen is taken up. Cool the reaction mixture to 40° C. and add 17 mls. of concentrated hydrochloric acid. Remove the catalyst by filtration and evaporate the filtrate under reduced pressure on a steam bath. Recrystallize the residue from isopropanol.

(C) 2-HYDROXY-7-METHYL-5-PROPIONYLBENZOXAZOLE

Add 0.15 mole of 5-methyl-3-amino-4-hydroxypropiophenone hydrochloride to 200 mls. of acetone. Stir the mixture at 15–20° C. and add all at one time 0.15 mole of anhydrous triethylamine and then in small portions add 0.25 mole of calcium carbonate over a period of about 5 minutes. Continue stirring until a uniform suspension is obtained and then add dropwise over a period of about 0.5 hour a solution of 0.2 mole of phosgene in 50 mls. of acetone while keeping the reaction temperature at 15–20° C. Continue stirring at 15–20° C. for 1 hour and then raise the temperature to 50–55° C. for about 0.75 hour until evolution of carbon dioxide ceases. Cool the mixture to 10° C. filter and wash the filter cake with water. Dry the crude product and recrystallize from alcohol 5.D.2B anhydrous.

(D) 2-AMINO-7-METHYL-5-PROPIONYLBENZOXAZOLE

Dissolve 0.08 mole of 5-methyl-3-amino-4-hydroxy propiophenone hydrochloride in 100 mls. of water at room temperature and add 0.08 mole of sodium acetate trihydrate. Cool the mixture to 10° C. and stir while adding a solution of cyanogen bromide (prepared by slowly adding a solution of 0.092 mole of potassium cyanide in 20 mls. of water to a mixture of 0.087 mole of bromine, 20 mls. of water and 60 gms. of ice with rapid stirring until the bromine is just decolorized) over a period of about 5 minutes. Continue stirring at 10–15° C. for about 10 minutes and then add 0.08 mole of sodium acetate trihydrate. Continue to stir at about 25° C. for 2 hours longer. Filter the crystalline suspension, wash the filter cake with water and dry at 60° C. Recrystallize the crude product from 200 mls. of anhydrous ethyl alcohol.

EXAMPLE 11

*2-Hydroxy-4-Methyl-5-Acetylbenzoxazole—2-Amino-4-Methyl-5-Acetylbenzoxazole*

(A) 2-METHYL-3-NITRO-4-HYDROXYACETOPHENONE

Add to a well-stirred mixture of 74 gms. of aluminum chloride in 100 mls. of nitrobenzene a solution of 0.2 mole of 2-nitro-m-cresol, 24 gms. of acetyl chloride and 75 mls. of nitrobenzene. Stir at 55–60° C. for 2.5 hours and overnight at room temperature. Pour the reaction mixture into a mixture of 500 mgs. of ice and 100 mls. of concentrated hydrochloric acid. Steam distill the acid solution and extract the residue with ether. Extract the ether solution with 3% sodium hydroxide solution and acidify with hydrochloric acid. Filter the crude product and recrystallize from ethanol.

(B) 2-METHYL-3-AMINO-4-HYDROXYACETOPHENONE

Employ the process of Example 1(B) to convert 2-methyl-3-nitro-4-hydroxyacetophenone into 2-methyl-3-amino-4-hydroxyacetophenone.

(C) 2-HYDROXY-4-METHYL-5-ACETYLBENZOXAZOLE

Employ the process of Example 1(C) to convert 2-methyl-3-amino-4-hydroxyacetophenone into 2-hydroxy-4-methyl-5-acetylbenzoxazole.

(D) 2-AMINO-4-METHYL-5-ACETYLBENZOXAZOLE

Employ the process of Example 1(D) to convert 2-methyl-3-amino-4-hydroxyacetophenone into 2-amino-4-methyl-5-acetylbenzoxozole.

EXAMPLE 12

*2-Hydroxy-5-Carbethoxy-6-Methylbenzoxazole—2-Amino-5-Carbethoxy-6-Methylbenzoxazole*

(A) 6-METHYL-3-NITRO-4-HYDROXYBENZOIC ACID

Add 0.22 mole of bromine to a rapidly stirred solution of 0.88 mole of sodium hydroxide in 100 mls. of water and 200 gms. of ice. When the formation of sodium hypobromite is complete, add 0.066 mole of 6-methyl-3-nitro-4-hydroxyacetophenone and stir the mixture for 0.25 hour. Raise the temperature to 50° C. and continue stirring for about 0.25 to 0.5 hour until all is dissolved excepting the lower layer of bromoform which separates during the reaction. Cool the mixture to 25° C. remove the bromoform and add sufficient sodium bisulfite to the aqueous solution to destroy any excess sodium hypobromite. Adjust the pH to about 1 with concentrated hydrochloric acid and allow the mixture to stand at 5° C. for several hours. Separate the crude product by filtration or extraction with ether and recrystallize from dilute alcohol.

(B) 6-METHYL-3-AMINO-4-HYDROXYBENZOIC ACID

Dissolve 0.1 mole of 6-methyl-3-nitro-4-hydroxybenozic acid in 150 mls. of absolute ethanol and add 0.3 gm. of 5% palladium on carbon catalyst. Shake the mixture in an atmosphere of hydrogen at about 50 lbs. pressure and at 50–60° C. until the theoretical amount of hydrogen is taken up. Remove the catalyst by filtration and remove the solvent and moisture by distillation under reduced pressure from a steam bath. Recrystallize the crude product from isopropanol or dry the crude product and use it in the next reaction.

(C) ETHYL-6-METHYL-3-AMINO-4-HYDROXYBENZOATE HYDROCHLORIDE

Dissolve the 6-methyl-3-amino-4-hydroxybenzoic acid obtained above in about 100 mls. of anhydrous ethyl alcohol. Cool the solution in an ice bath and saturate it with dry hydrogen chloride. Heat the reaction mixture on a steam bath under a reflux condenser for 4 to 5 hours. Remove the excess alcohol, hydrogen chloride and water by distillation under reduced pressure. Purify the residual crude ester hydrochloride by recrystallization from absolute ethanol. Where the free base is desired, employ the process of Example 2(B).

(D) 2-HYDROXY-5-CARBETHOXY-6-METHYLBENZOXAZOLE

Mix 0.2 mole of ethyl-6-methyl-3-amino-4-hydroxybenzoate (or the hydrochloride thereof) with 600 mls. of acetone. Stir the mixture until solution is complete (stir until a uniform dispersion is obtained when using the hydrochloride). Add 0.3 mole of calcium carbonate (0.4 mole when the hydrochloride is used) and cool the suspension to 10–20° C. Add a solution of 0.24 mole of phosgene in 100 mls. of acetone dropwise over a period of 0.5 to 1.0 hour. Continue stirring at 15–25° C. for 1 to 3 hours longer, then raise the temperature to 50–55° C. for 1 to 3 hours. Add 50 mls. of water and remove the solvent by distillation from a steam bath. Cool the residue to 25° C. Add 500 mls. of water and sufficient concentrated hydrochloric acid to dissolve the excess calcium carbonate and to bring the pH to 1.2. Separate the crude benzoxazole by filtration and recrystallize from isopropanol.

(E) 2-AMINO-5-CARBETHOXY-6-METHYLBENZOXAZOLE

Dissolve 1.3 mole of ethyl-6-methyl-3-amino-4-hydroxybenzoate (or the hydrochloride thereof) in 1,000 mls. of methanol and cool the solution to 5° C. by the addition of chopped ice. Add an ice cold suspension of 1.5 mole of cyanogen bromide (prepared as in Example 1(D)) in 1,000 mls. of water over a period of 5 minutes with rapid stirring. Continue stirring at 20–25° C. for 0.75 hour. With continued stirring add 1.3 mole of solid sodium bicarbonate in small portions over a period of 1.5 hours to neutralize the hydrobromic acid formed in the reaction and to bring the pH to 6.5–7. Continue stirring for 1 hour. Filter off the 2-amino-benzoxazole compound, wash with water and recrystallize from dioxane.

EXAMPLE 13

*2-Hydroxy-5-Carbomethoxy-4-Methylbenzoxazole—2-Amino-5-Carbomethoxy-4-Methylbenzoxazole*

Using anhydrous methyl alcohol in the esterification of Example 12(C), employ the process of Example 12 to convert 2-methyl-3-nitro-4-hydroxyacetophenone into the title compounds.

EXAMPLE 14

*2-Hydroxy-5Carbo-n-Butoxy-7-Methylbenzoxazole—2-Amino-5-Carbo-n-Butoxy-7-Methylbenzoxazole*

Using anhydrous n-butyl alcohol in the esterification of Example 12(C), employ the process of Example 12 to convert 5-methyl-3-nitro-4-hydroxyacetophenone into the title compounds.

EXAMPLE 15

*2-Hydroxy-5-Carbethoxy-4,7-Dimethylbenzoxazole—2-Amino-5-Carbethoxy-4,7-Dimethylbenzoxazole*

Employ the process of Example 12 to convert 2,5-dimethyl-3-nitro-4-hydroxyacetophenone into the title compounds.

EXAMPLE 16

*2 - Hydroxy - 5 - Carbo-n-Propoxy-4-Methyl-7-Chlorobenzoxazole—2 - Amino - 5 - Carbo-n-Propoxy - 4-Methyl-7-Chlorobenzoxazole*

Using anhydrous n-propyl alcohol in the esterification of Example 12(C), employ the process of Example 12 to convert 2-methyl-5-chloro-3-nitro-4-hydroxyacetophenone into the title compounds.

EXAMPLE 17

*2 - Hydroxy - 5 - Carbo-i-Propoxy-6,7-Dimethylbenzoxazole—2-Amino - 5 - Carbo-i-Propoxy-6,7-Dimethylbenzoxazole*

(A) 2,3-DIMETHYL-6-NITROPHENOL

Add 1.05 mole of 90% nitric acid to a rapidly stirred solution of 1.0 mole of 2,3-dimethylphenol in 250 mls of glacial acetic acid over a period of 1 hour at 25–30° C When all is added, stir the reaction mixture for 0.5 hour longer at 25–30° C. and then pour it into a mixture of 1,000 mls. of water and 500 gms. of ice. When the ice is melted, separate the aqueous acetic acid and steam distill the crude mixture of 2,3-dimethyl-4 and 2,3-dimethyl-6-nitrophenols. Separate the 6-nitro isomer from the distillate by extraction with ether, dry the ether extract with anhydrous magnesium sulfate and remove the solvent by distillation.

(B) 5,6-DIMETHYL-3-NITRO-4-HYDROXY-ACETOPHENONE

Add a mixture of 0.5 mole of 2,3-dimethyl-6-nitrophenol and 0.75 mole of acetyl chloride to a solution of 1.4 mole of anhydrous aluminum chloride in 400 ml. of nitrobenzene at 25–30° C. over a period of 0.5 hour with rapid stirring. Stir at 55–60° C. for 2.5 hours and then at room temperature for 18 hours. Pour the reaction mixture into 2,500 mgs. of chopped ice and stir until all the aluminum chloride complex is decomposed. Separate the nitrobenzene layer and steam distill to remove all the nitrobenzene and unreacted phenol. Dissolve the crude residue in 2% sodium hydroxide solution, add 10 gms. of decolorizing carbon and stir for 0.5 hour. Filter and acidify the filtrate with a slight excess of concentrated hydrochloric acid. Filter the purified product, wash with water and dry.

(C) 2-HYDROXY-5-CARBO-i-PROPOXY - 6,7 - DIMETHYL-BENZOXAZOLE—2 - AMINO-5-CARBO-i-PROPOXY-6,7-DIMETHYLBENZOXAZOLE

Using anhydrous i-propyl alcohol in the esterification of Example 12(C), employ the process of Example 12 to convert 5,6-dimethyl-3-nitro-4-hydroxyacetophenone into the title compounds.

EXAMPLE 18

*2-Hydroxy-5-Carbethoxy-4,6-Dimethylbenzoxazle—2-Amino-5-Carbethoxy-4,6-Dimethylbenzoxazole*

(A) 2,6-DIMETHYL-3-NITRO-4-HYDROXYBENZOIC ACID

Reflux a solution of 0.1 mole of 2,6-dimethyl-3-nitro-4-methoxybenzoic acid in a mixture of 100 mls. of acetic acid and 100 mls. of 48% hydrobromic acid. Remove the acetic acid and excess hydrobromic acid by distillation under reduced pressure from a steam bath. Recrystallize the crude product from aqueous methanol.

(B) 2 - HYDROXY-5-CARBETHOXY-4,6-DIMETHYLBENZ-OXAZOLE—2 - AMINO - 5 - CARBETHOXY-4,6-DI-METHYLBENZOXAZOLE

Employ the process of Example 12(B)–12(E) to convert 2,6-dimethyl-3-nitro-4-hydroxybenzoic acid into the title compounds.

The subject matter which applicant regards as his invention is particularly pointed out and distinctly claimed as follows:

1. Benzoxazole having at the 2-position a member of the group consisting of hydroxyl and amino, a lower alkanoyl group in the 5-position, and in the benzenoid portion of the nucleus in other than the 5-position a member of the group consisting of hydrogen, halogen and lower alkyl.
2. 2-hydroxy-5-propionylbenzoxazole.
3. 2-amino-5-propionylbenzoxazole.

References Cited in the file of this patent

Nagano et al.: J. Am. Chem. Soc., Vol. 75, pp. 2770–1 (1953).

Ricci: Chem. Abstracts, Vol. 50, col. 5564 (1956).